United States Patent [19]

Ryan et al.

[11] Patent Number: 5,236,259
[45] Date of Patent: * Aug. 17, 1993

[54] TOWER SYSTEM UNIT WITH ANGLED DRIVE BAY

[75] Inventors: Dean Ryan, Ventura, Calif.; Charles R. Lewis, Eindhoven, Netherlands; George R. Daniels, Houston, Tex.; Donald E. Moore, Houston, Tex.

[73] Assignee: Compaq Computer Corporation, Houston, Tex.

[*] Notice: The portion of the term of this patent subsequent to Dec. 18, 2007 has been disclaimed.

[21] Appl. No.: 796,037

[22] Filed: Nov. 19, 1991

Related U.S. Application Data

[60] Division of Ser. No. 431,288, Nov. 3, 1989, abandoned, and a continuation-in-part of Ser. No. 291,746, Dec. 29, 1988, Pat. No. Des. 313,015.

[51] Int. Cl.$^5$ .............................................. A47B 96/00
[52] U.S. Cl. ................................. 312/244; 312/223.2
[58] Field of Search ................ 174/50, 52.1; 361/331, 361/356, 380; 312/244, 320, 223.2

[56] References Cited

U.S. PATENT DOCUMENTS

| | | |
|---|---|---|
| D. 313,015 | 12/1990 | Ryan et al. . |
| 3,489,911 | 1/1970 | Varner et al. .................. 174/52.1 X |
| 3,899,721 | 8/1975 | Borchard et al. . |
| 4,065,200 | 12/1977 | D'Angelo . |
| 4,093,327 | 6/1978 | Linger ................................. 312/244 |
| 4,168,870 | 9/1979 | Hill .................................. 312/244 X |
| 4,232,356 | 11/1980 | Saunders et al. . |
| 4,304,966 | 12/1981 | Beirn et al. . |
| 4,349,237 | 9/1982 | Cobaugh et al. . |
| 4,479,263 | 10/1984 | Rosenfeldt et al. . |
| 4,517,512 | 5/1985 | Petrich et al. . |
| 4,532,576 | 7/1985 | Reimer . |
| 4,742,478 | 5/1988 | Nigro, Jr. et al. . |
| 4,748,540 | 5/1988 | Henneberg et al. . |
| 4,920,453 | 4/1990 | Onose et al. . |

FOREIGN PATENT DOCUMENTS

| | | |
|---|---|---|
| 0176907 | 4/1986 | European Pat. Off. . |
| 1366567 | 6/1964 | France . |
| 1-194397 | 8/1989 | Japan . |
| 87/05776 | 8/1987 | PCT Int'l Appl. . |
| 0659165 | 12/1986 | Switzerland . |
| 1140276 | 2/1985 | U.S.S.R. . |

OTHER PUBLICATIONS

Four Copies of Photographs Showing the Disk Drive Bay of IBM PS/2 Model 80 Unit.
Two Copies of Photographs Showing a Carrying Means on the IBM PS/2 Model 80 Unit.
Four Copies of Photographs Showing Disk Drive Mounting Means of Compaq Deskpro 386/25 Unit.
3 Copies of Photographs Showing the Disk Drive Mounting Means of Compaq Deskpro 386S.
IBM Tech. Discl. Bull., vol. 29, No. 9, Feb. 87, pp. 4117–4118, "Bridge Assembly for Mounting Interchangeable Electromagnetic Devices" (no author).
IBM Tech. Discl. Bulletin, vol. 28, No. 12, May 86, pp. 5519–5521, "Spring-Loaded File Rails", (No Author).
IBM Tech. Discl. Bulletin, vol. 30, No. 1, Jun. 87, pp. 392–393, "Direct-Access Storage Device Commodity-Stacking Plates", (No Author).
IBM Tech. Discl. Bulletin, vol. 28, No. 6, Nov. 1985, pp. 2514–2515, "Univeersal, Low-Cost Hard-File Mounting Assembly", (No Author).

*Primary Examiner*—Peter R. Brown
*Attorney, Agent, or Firm*—Pravel, Hewitt, Kimball & Krieger

[57] ABSTRACT

A tower unit for a personal computer wherein the tower unit is a generally rectangular box having a generally rectangular interior chassis. The interior chassis includes a first set of interiorly extending mounting flanges and tabs which are positioned and aligned on opposing chassis walls to mount one or more drives at an upwardly facing angle in order to allow the user visual and manual access to the drives for ease of operation. A similar combination of interiorly directed tabs and flanges are formed in the opposing side walls of the frame near the bottom of the tower unit chassis in order to mount a plurality of hard disk drives in horizontal positions. The frame includes a front frame panel which combines with the front bezel to provide a gripping area which cooperates with another gripping area formed in the rear bezel to allow the tower unit to be easily moved about.

3 Claims, 5 Drawing Sheets

TOWER SYSTEM UNIT WITH ANGLED DRIVE BAY

CROSS-REFERENCE TO RELATED APPLICATIONS

This is a division, of application Ser. No. 431,288, filed Nov. 3, 1989 now abandoned, and a continuation-in-part of U.S. design patent application Ser. No. 291,746, filed Dec. 29, 1988 entitled "Personal Computer.", now issued as U.S. Pat. No. Des. 313,015. This patent application relates to U.S. patent application Ser. No. 431,571, filed on Nov. 3, 1989 and entitled ¢Stabilizing Apparatus With Extensible Legs For Computer System Tower Unit", now issued as U.S. Pat. No. 5,020,768 ; U.S. patent application Ser. No. 431,337, filed on Nov. 3, 1989, entitled "Switch Cover", now issued as U.S. Pat. No. 5,021,616.

BACKGROUND OF THE INVENTION

1. Field of the Invention

The present invention relates to a computer system tower unit.

2. Description of the Prior Art

Personal computers are generally comprised of three physical components. Firstly, there is the main system unit, which holds most of the computer operation internals such as power supply, circuit boards and disk drives. A keyboard is used for data entry and a display screen or monitor is provided for the display of data. This arrangement is, of course, well-known. Typically, all three of these components are arranged on a desk top with the keyboard placed in front of the system unit and the display screen or monitor placed on top of the system unit. Such an arrangement requires a considerable amount of work surface area, which can be a problem when the user has only a relatively small amount of desk top space available. In an effort to minimize the desk surface area required for a personal computer, the system units have been placed on the floor next to desks or tables. In that configuration, the system units are generally rectangular boxes and are designed to stand with the longest axis in the vertical direction on the floor. These systems are called "tower units."

Presently known system tower units are generally rectangular and box-like in configuration, with the longest axis in the vertical direction. Such presently known tower units typically include a floppy disk drive bay at the top of the tower unit, with the drive bay face being in a vertical plane, which means that the floppy disks are inserted and removed from a substantially horizontal position within the floppy disk drives. This is inconvenient for the user since the user must bend over from his or her desk to load and unload the floppy disk drive units. In some tower units, the floppy disk drives are even mounted for insertion in a vertical plane but again, since the disk drive face is also in a vertical plane, it is necessary for the user to bend over chair in order to have a good view of the floppy disk drive in order to insert and remove a disk. In either situation, the location and orientation of the disk drive units are inconvenient to the user. Another problem with towers are mobility. The tower units are sufficiently large and heavy that it is difficult to move them about since known tower units do not have easily accessible gripping areas.

SUMMARY OF THE INVENTION

This invention relates to the tower unit for a computer system wherein the tower unit includes a chassis for mounting disk drives in a highly convenient position and orientation. The chassis generally includes a rectangular box-like frame including front and rear walls connected with opposing side walls. The front wall for the chassis includes an upwardly angled disk drive bay which includes an upwardly angled bay face for receiving disk drive units. Angled mount means are positioned within the frame and form part of the opposing side walls for mounting one or more disk drive units at an upwardly facing angle to allow greater ease of access for the entry and removal of disks. Each of the angled mount means includes a first substantially straight inwardly extending flange for receiving and supporting an outwardly extending flange on a disk drive unit. Additionally, angled, inwardly extending camming tabs are formed with the opposing side walls for receiving the leading edge of the disk drive flanges and guiding the disk drive flanges into a final, upwardly facing angled position.

Additionally, the chassis and the front and rear bezels cooperate to provide a rear gripping recess and a front gripping recess below the angled bay face to allow the user to grip the tower unit on both ends for moving about.

These features of this invention are not necessarily the only features that will be disclosed in the specification. Additionally, the features of this invention have been described herein in a summary fashion. It is not the intent to disclose all of the features nor the true scope of the invention within this Summary of the Invention. The specification will describe the details of this invention for the understanding of those skilled in the art and the claims will describe the actual scope of the invention.

DESCRIPTION OF THE PREFERRED EMBODIMENT

Figure 1A:
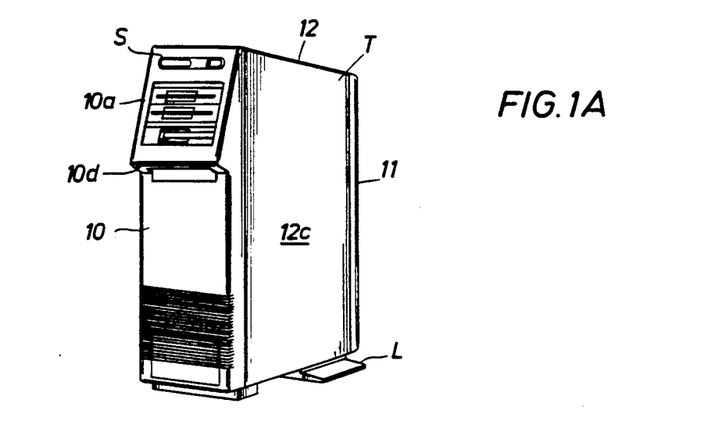
FIG. 1A is a perspective view of the system tower unit of this invention including front and rear bezel.
Figures 1B, 1C:
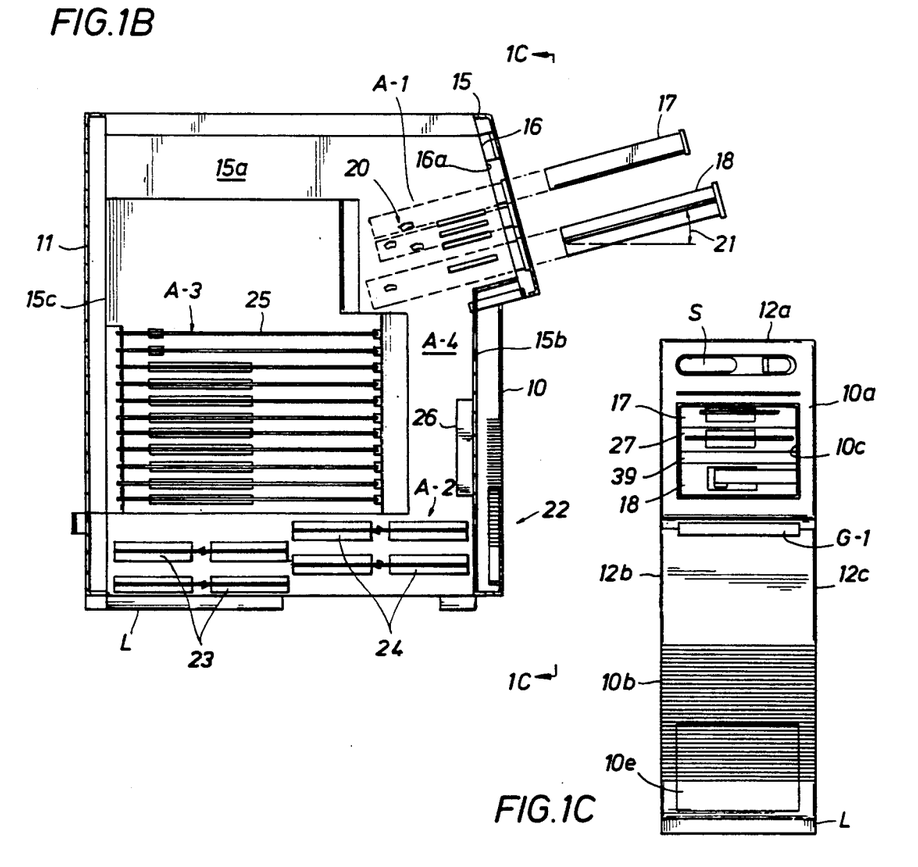
FIG. 1B is a side, partly sectional view of one side wall of the chassis viewed from the inside and the front and rear bezel of the system tower unit with disk drive units positioned schematically for insertion or removal.
FIG. 1C is a front view of the tower unit of this invention.

Referring to the drawings, the letter T generally designates the tower unit of this invention. The tower unit is a generally rectangular box in configuration, with its longest axis in the vertical direction, and as illustrated in FIG. 1A, includes a front bezel 10, a rear bezel 11 and a U-shaped hood 12 which forms the top 12a and side panels 12b and 12c. The front and rear bezels 10 and 11 attach in part to the U-shaped hood 12 which mounts over the frame 15 (FIG. 1C). The front bezel 10 includes an upwardly angled disk drive bay 10a which cooperates with the tower unit chassis, to be described hereinafter, to mount one or more disk drives at an upwardly facing angle so that the user may have a better view and better access to the disk drive units for the insertion and removal of floppy disks. The upwardly angled bay 10a includes a switch cover assembly S which will not be described in detail herein but which is the subject of U.S. patent application Ser. No. 431,337, having a filing date of Nov. 3, 1989 and entitled "Switch Cover", now issued as U.S. Pat. No. 5,021,616, which is incorporated herein by reference. The tower unit T further includes a stabilizing apparatus with extensible legs generally designated as L mounted to the bottom of the tower unit in order to provide stability and extensible support to the unit. This stabilizing apparatus L is described in detail in U.S. patent application Ser. No. 431,571 having a filing date of Nov. 3, 1989 entitled "Stabilizing Apparatus with Extensible Legs for Computer System Tower Unit", now issued as U.S. Pat. No. 5,020,768 which is incorporated herein by reference. Additionally, as noted above, the overall design of the tower unit is disclosed in U.S. design patent application Ser. No. 291,746 having a filing date of Dec. 29, 1988 and entitled "Personal Computer" and is also incorporated herein by reference and claimed as a parent application.

Figure 2:
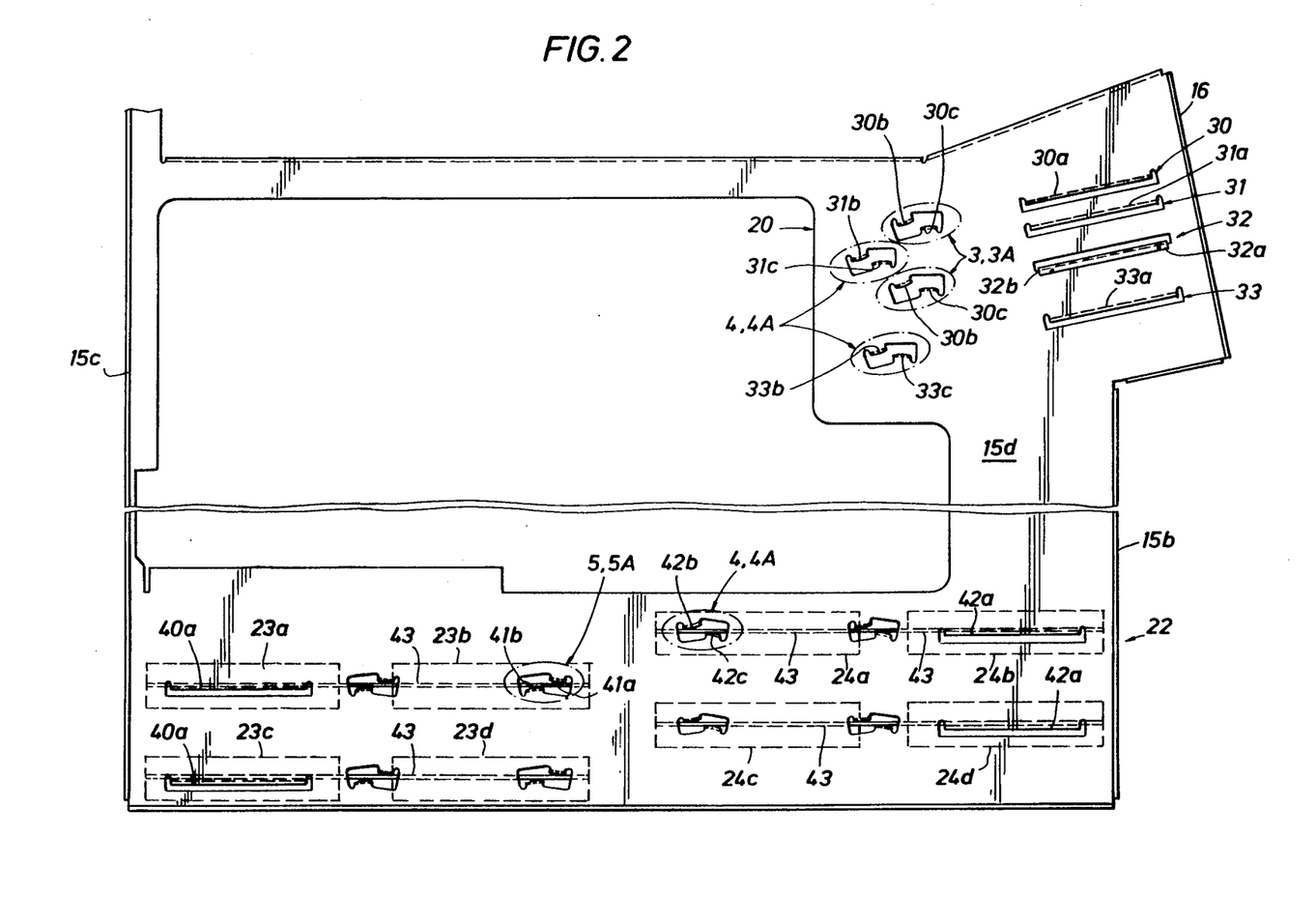
FIG. 2 is a side view, partially in schematic, from the outside of the other side wall of the chassis system tower unit.

FIG. 1B is a side view, partly in schematic, of the inside of the tower unit T. As viewed in FIG. 1B, the tower unit T includes the rectangular box-like chassis or frame generally designated as 15. The generally rectangular chassis 15 includes a first side wall 15a, a front wall 15b, a rear wall 15c and an opposing side wall 15d, which is shown in FIG. 2. The chassis side wall 15a is viewed from the inside as shown in FIG. 1B. Further shown are some of the internals of the tower unit T.

The chassis 15 includes a first or upper disk loading area generally designated as A-1. This disk loading area is formed by the cooperation of opposing side walls 15a and 15d in cooperation with the front wall 15b. The front wall 15b includes an upper, angled section 16 which includes a rectangular opening 16a to receive disk drive units 17 and 18 or other similarly configured disk drive units. Angled mount means generally designated as 20 are formed with the opposing side walls 15a and 15d and extend inwardly therefrom in order to mount drive units such as 17 and 18 at an upwardly facing angle 21 with respect to horizontal for the purpose of allowing the operator ease of access to use of disk or tape drives 17 and 18. It should be noted that the disk drives 17 and 18 receive floppy disks but it is within the scope of this invention to mount in area A-1 one or more hard disk drives, or CD-ROM drives, also.

A second mount means generally designated as 22 is formed with the opposing side walls 15a and 15d at the bottom of the tower unit T for the purpose of receiving a plurality of hard disk drive units generally designated as 23 and 24. For purposes of definition the hard disk drive units 23 and 24 are mounted by the second mount means 22 in a lower, second area A-2 within the chassis 15 of the tower unit T.

The chassis 15 further houses typical tower unit components including a system board area A-3 for the mounting of horizontally mounted operating circuit boards such as 25. The area A-4 is the plenum area for housing a fan within the annular wall area 26, which provides a fan intake on the inside of the front wall 15b for purposes of circulating air through the computer internals. The front bezel 10 includes a plurality of horizontal vents 10b molded into the lower portion of the bezel or front for the purpose of allowing air to be circulated through the panel, through the fan intake at 26 and thus into and through the internal area of the chassis 15. This vent structure provides for part of the air circulation through the frame. A majority of the air circulation is provided by the gripping means G-1 to be described with respect to FIGS. 6-8.

Figure 9:
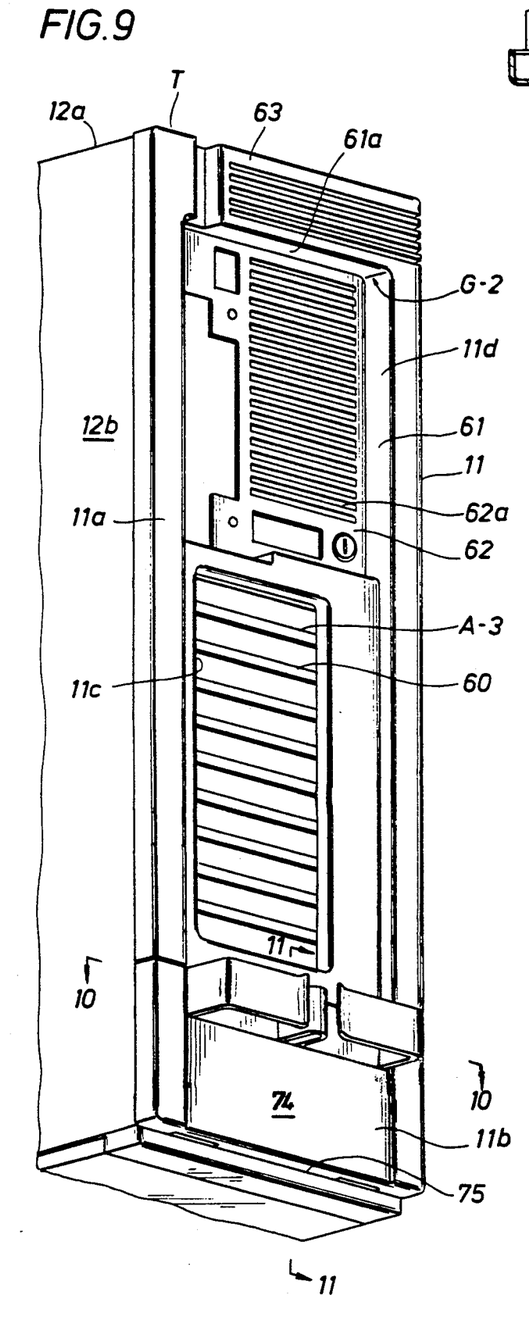
FIG. 9 is a perspective view of the rear bezel of the tower unit.

The disk drive bay 10a of the front bezel 10 further includes the upwardly facing disk drive bay surface which also has a rectangular opening 10c which aligns with a similar rectangular opening 16a in the front chassis member or wall 15b for receiving the drive units 17 and 18. The front bezel 10 further includes a transitional section 10d which is formed with the lower bezel section and the upwardly facing drive bay 10a to form the bezel configuration illustrated in FIG. 1A wherein the bezel face 10a faces upwardly to allow the user easier access to the drive units such as 17 and 18. A hand grip recess G-1 is a generally rectangular opening which is formed in the main bezel face and in the transitional section 10d of the bezel in order to allow a person to extend his or her hand inwardly to raise or move the front portion of the tower unit T. A second gripping recess G-2 is illustrated in a perspective view of the rear bezel 11 as depicted in FIG. 9.

One of the design challenges in manufacturing a chassis 15 is to provide a chassis that has sufficient strength to properly support the various computer internals and yet to allow the unit to be manufactured as inexpensively as possible, with sufficient engineering reliability to insure that the units can be mass produced with consistency. The chassis 15 is typically made of a lightweight, yet sufficiently strong metal such as aluminum. The front and rear bezels 10 and 11 are made from a suitable polycarbonate plastic which may be injection molded or otherwise manufactured. The hood 12 is made from sheet metal covered with a plastic coating or paint.

The first angle mount means 20 and the second mount means 22 for mounting the drives 17, 18, 23 and 24 fit these various engineering criteria by providing mount means which are partly integrally formed with the opposing side walls 15a and 15d to provide internal flanges and tabs which may be located with engineering precision but which may be stamped and thus formed when the side panels are produced.

Referring now to FIG. 2, opposing side wall 15d is viewed from the outside, with the features non-essential to this invention being removed or only schematically shown. In FIG. 2, the first, angled mount means generally designated as 20 and the second, lower mount means generally designated as 22 are illustrated in greater detail as compared to FIG. 1B for the purpose of describing the detailed structure of the mount means. The opposing wall 15d is illustrated from the outside of the tower unit T looking inwardly. Therefore, the dashed lines which are illustrated at various points and will be further discussed herein represent flange or tab portions of the mount means 20 and 22 which extend inwardly into the chassis 15 of the tower unit.

The angled mount means 20 may mount several different combinations of drive units 17, 27 and 18, as shown in FIGS. 1B and 1C. The relative size as illustrative of the drive units 17 and 18 is intended to convey the fact that various sizes (as well as types) of drive units may be mounted within the chassis 15 by the mount means 20. For example, the drive unit 17 may be a "one-third" height disk drive. A second disk drive 27 of the same one-third height may be mounted under the first disk drive 17, which is illustrated in FIG. 1C. The disk drive 18 may be a "one-half" height disk drive. Additionally, it is within the scope of this invention to mount hard disk drives or other hardware as previously discussed in place of the floppy disk drives 17, 27 and 18 within the chassis recessed area A-1 utilizing the angled mount means 20. For further purposes of this discussion, the mounting of the floppy disk drive units 17, 27 and 18 will now be discussed.

The angled, drive mount means 20 includes first mount means 30, second mount means 31, third mount means 32 and fourth mount means 33. Each of the first through fourth angled mount means 30-33 are comprised of the same or substantially similar components and thus, to the extent applicable, the same numbers and letters will be utilized to describe similar parts.

Figure 3:
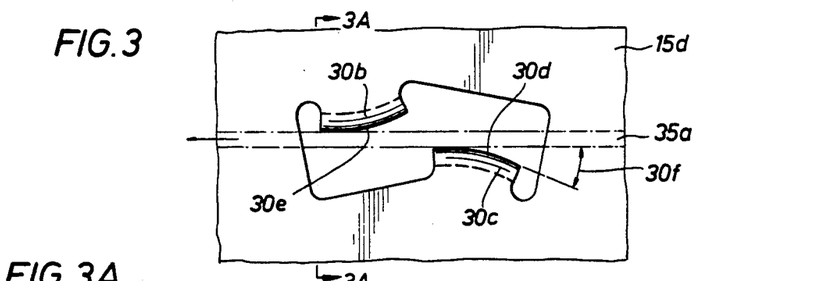
FIG. 3 is an isolated view of one set of the internal camming tabs which guide the disk drive units into an upwardly angled position.
Figure 3A:
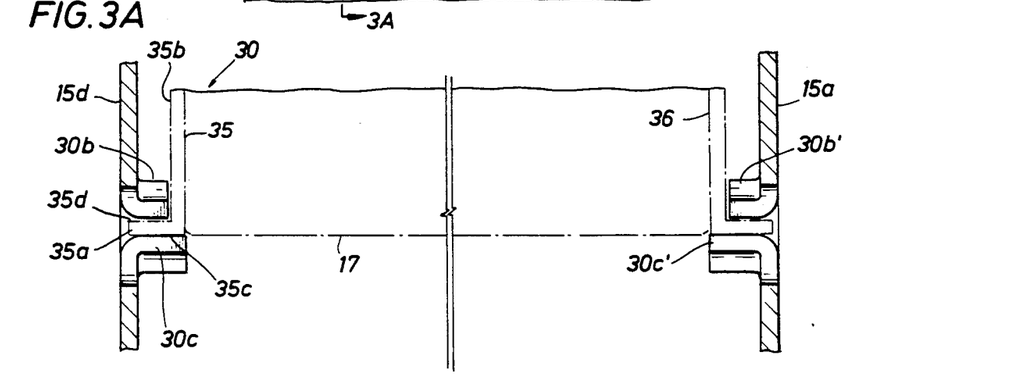
FIG. 3A is a view taken along line 3A—3A of FIG. 3 illustrating the disk drive unit and its side flanges in position in opposing sets of the camming tabs of FIG. 3.

The first angled mount means 30 mounts the disk drive 17. Angled mount means 30 includes an inwardly extending substantially straight flange portion 30a which is directed at the upwardly facing angle 21 in order to mount the disk drive unit 17 in such position. In addition to the inwardly extending straight flange portion 30a, a sub-set of camming tabs 30b and 30c are formed integrally with the sidewall portion 15d. This first angled mount means 30 is illustrated in greater detail on FIGS. 3 and 3A. Referring in particular to FIGS. 3 and 3A, the floppy disk drive unit 17 has mounted on each side of the unit L-shaped flange members 35 and 36, when viewed in the cross section illustrated in FIG. 3A. Each of the flange members 35 and 36 were identical except for their opposing relationship. The flange member 35 is L-shaped in configuration and includes a first flange portion 35a and a second flange portion 35b which is actually mounted by any suitable means such as screws, in a known manner, to the drive unit 17 itself. The outwardly extending flange portion 35a includes a lower surface portion 35c which is designed to rest upon an upper surface of the tab portion 30c. The outwardly extending flange portion 35a includes a upper surface portion 35d which is shorter in width than the lower surface portion. The lower surface portion 35c thus has a greater width of surface area to thereby receive the camming tab 30c, which extends inwardly further than the camming tab 30b. In this manner, the camming tab 30c, which extends further inwardly and is first to receive the entering disk drive, provides greater surface area to receive the greater flange surface area 35c of the flange member 35 and thus provide more stability for mounting the entire floppy disk drive 17.

The camming tabs 30b and 30c are actually manufactured as part of the stamping process of forming the wall member 15d. Each of the camming tabs 30b and 30c are bent inwardly and have curved surfaces. The upper curved surface 30d of the leading tab member 30c and the upper curved surface 30e of the tab member 30b are angled openly at angle 30f with respect to the disk drive unit flange portion 35a in order to guide the disk drive flange portion 35a in between the tabs to a final resting position. In this manner, each of the interior, guiding, curved surfaces 30d and 30e provide a first surface portion to actually receive the leading edge of the flange portion 35a and guide the flange portion 35a between the tab members 30b and 30c. Because of the curved configuration of the tab members 30b and 30c another portion of the surfaces 30d and 30e actually receive the flange portion 35a when the disk drive unit 17 has come to rest. The alignment of the combination of the tab portions 30b and 30c and the substantially straight flange portion 30a is in a direction which forms the upwardly facing angle defined as 21 in FIG. 1B in order to mount the disk drive unit 17 at such angle. In a similar manner, the first angle mount means 30, as illustrated FIG. 3A, is also formed in opposing side wall 15a. Thus, the corresponding lower, leading tab member 30c' cooperates with the corresponding upper tab member 30b' formed integrally with the wall member 15a to mount the other disk drive L-shaped flange 36 at the upwardly facing angle 21 in order to mount the disk drive unit 17 in an upwardly facing position for ease of access as has been described.

The third upwardly facing angle mount means 32 is provided for mounting another one-third height disk drive 27. For the third upwardly facing angle mount means 32, a similar set of tabs 30c and 30b are provided in cooperation with a slot 32a and flange 32b. Instead of having a substantially straight flange portion such as 30a formed integrally with the wall 15d, an L-shape member 32b is attached by suitable means such as rivets to the outside wall to provide an inwardly extending flange portion.

Figure 4:
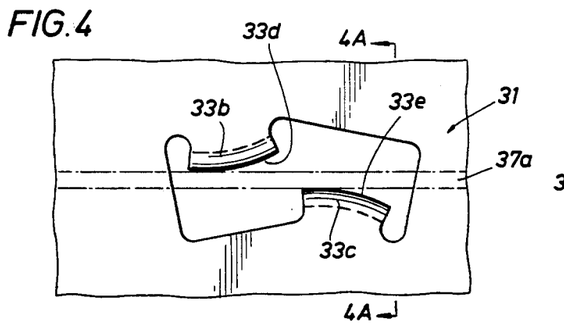
FIG. 4 is an isolated view of another set of camming tabs of this invention.
Figure 4A:
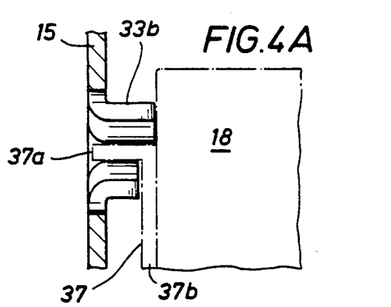
FIG. 4A is a view taken along line 4A—4A of FIG. 4 illustrating the mounting of a disk drive unit having the disk drive unit flanges extending from the top of the disk drive unit.

The second angle mount means 31 and the fourth angle mount means 33 are of the same configuration and are illustrated in detail in FIG. 4. The fourth angle mount means 33 actually mounts the one-half height drive 18. No drive is actually mounted in mount means 31, but mount means 31 can mount a one-half height drive means, too, and is of identical structure to the fourth mount means 33. Referring to FIGS. 4 and 4A, the fourth disk drive angle mount means 33 includes a substantially straight inwardly extending flange portion 33a and camming tab portions 33b and 33c positioned adjacently and in opposing relationship to each other, which are structurally identical to 31a, 31b and 31c, respectively.

Referring now to FIG. 4, the fourth angled disk drive mount means 33 will be discussed in detail. The one-half height disk drive 18 is illustrated schematically. Again, the disk drive will have opposing outwardly extending flange members. Here only one flange member 37 is illustrated. The flange member 37 is L-shaped and includes and upper flange portion 37a which extends outwardly from a second flange portion 37b which is actually attached to the disk drive unit 18. Basically, the only difference between the disk drive unit 18 and the disk drive unit 17, in addition to size, is the orientation of the outwardly extending flange members 35 and 37, respectively. The camming tab members 33b and 33c are adjacently positioned and include inwardly extending portions adapted to receive the outwardly extending disk drive flange portion 37a. The internally extending tab members 33b and 33c have opposing, curved surfaces 33d and 33e adapted to receive and guide the leading edges of the disk drive unit 27 and its outwardly extending flange portions 37a between the tabs to a final resting position. The upper camming tab portion 33b has a greater width as viewed in FIG. 4A in order to rest against the wider, upper surface of the extending flange portion 37a. The interior, curved faces 33d and 33e of the camming tab members 33b and 33c act to cam and guide the flange member 37a of the disk drive unit 18 in between the two tab members to the final resting position, which is at the upwardly facing angle 21. The oppositely positioned, mirror image tab members of the fourth angled disk drive mount means 33 are shown in FIG. 2.

Suitable filler plates such as 39 are mounted into the chassis face plate 16a such as by screws or the like to fill in any spaces between the disk drives. The disk drives are actually also screwed into the position into the chassis face plate 16a in a known manner.

Figure 5:
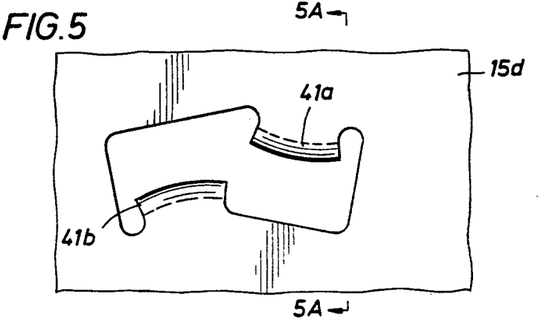
FIG. 5 is an isolated view of another configuration for camming tabs utilized to mount hard disk drive units in the lower portion of the tower unit chassis.
Figure 5A:
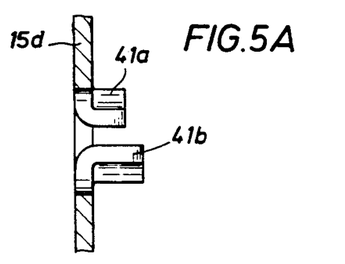
FIG. 5A is a side view taken along line 5A—5A of FIG. 5.

In addition to the mounting of floppy disk drives such as 17, 27 and 18 at an upwardly facing angle, the chassis 15 further includes an area A-2 located at the bottom of the chassis for mounting a series of hard disk drive units generally identified as 23 and 24 (FIG. 1B). The disk drive mount means 22 is provided for mounting the series hard disk drive units 23 and 24 in the area A-2. The basic configuration for the hard disk drive mount means 22 is quite similar to that for the angled disk drive mount means generally designated as 20. For hard disk drive units 23a, 23b, 23c and 23d, the mounting means 22 includes basically the same combination of structural elements. For each drive unit 23a-23d, the drive units are mounted by a combination of substantially straight, horizontally positioned internally extending flange members 40a which cooperate with adjacently positioned inwardly extending tab members 41a and 41b which are illustrated in detail in FIG. 5 for side wall 15d. The caming tabs 41a and 41b operate in a manner similar to those previously described. The camming tabs 41a and 41b cooperate with substantially straight, inwardly extending flange portions 41a to receive an outwardly extending flange (not shown) mounted on one or more hard disk drive units such as 23a-23d. The disk drive units 23a-23d are only illustrated schematically and thus the flange portions mounted on the outside of the hard disk drive units in a manner similar to those described with respect to the floppy disk drive units such as 17, are not actually shown. But it will be understood that such flange units on the disk drives, such as 23a-23d, are inserted through an opening in the rear bezel 11 and are mounted in a substantially horizontal position upon the substantially straight internally directed flange members 40a and between the adjacently positioned camming tab members 41a and 41b. With respect to FIG. 5A, it should be noted that the internally directed, lower tab member 41b has a greater surface area for the purpose of receiving the outside portion of the outwardly extending flange members on the disk drive units.

Hard disk drive units 24a-24d are illustrated schematically in FIGS. 1B and 2. These hard disk drive units 24a-24d are inserted through an opening provided by removable door 10e in the front bezel 10. The mount means generally designated as 22 for mounting the hard disk drive units 24a-24d, or any other combination of hard disk drive units, is provided by a combination of substantially straight interiorly directed flange members 42a and one or more sets of adjacently positioned camming members 42b and 42c. The structure of the adjacently positioned camming members 42b and 42c is the same as the structure for camming members 31b and 31c of the second angled disk drive mount means 31 illustrated in FIG. 4.

Figure 6:
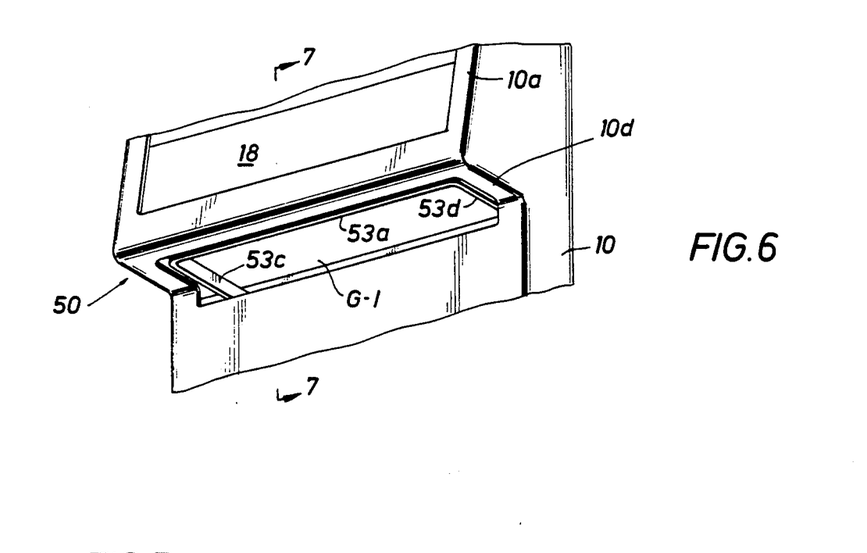
FIG. 6 is a perspective view of the gripping recess positioned below the upwardly angled disk drive bay of the tower unit.
Figure 7:
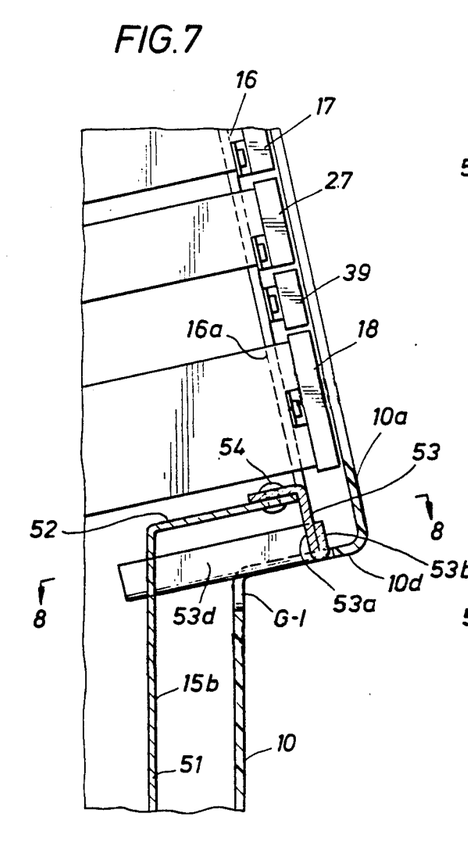
FIG. 7 is a side view of the angled drive bay and the gripping recess of FIG. 6.
Figure 8:
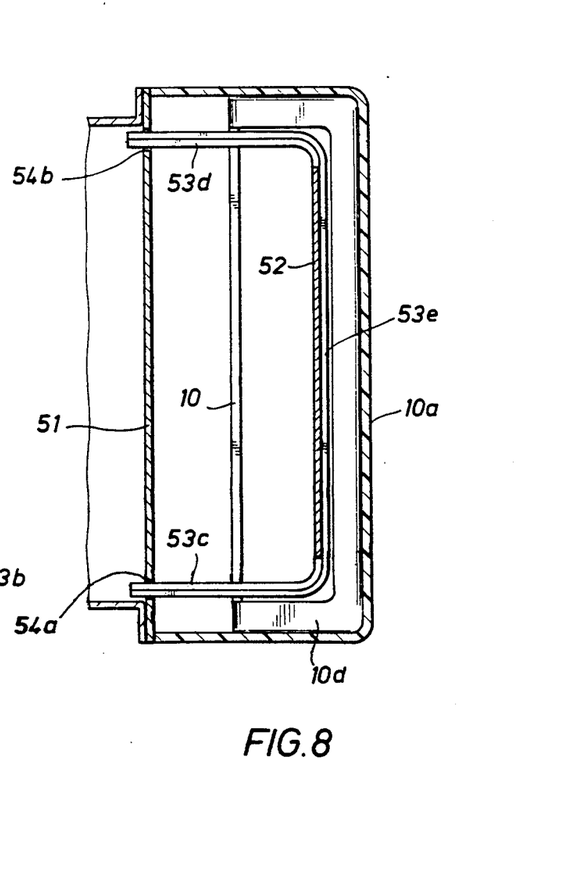
FIG. 8 is a top view, partly end section of the gripping recess below the angled disk drive bay.

Referring now to FIGS. 6-8, a recess G-1 is provided in the front bezel 10 of the tower unit T for providing a gripping point so that the tower unit T may be picked up at its front end and moved about. The front gripping means, generally designated as 50 and illustrated in FIGS. 6-8, is provided by a combination of the frame 15 and the front bezel 10. It has been previously described that the frame 15 includes a front wall 15b. The front wall 15b includes a generally vertical, lower section 51, a transitional section 52 and the disk drive bay section 16 having the opening 16a as previously described. The transition section 52 generally extends at the same angle as the mounting angle 21 for the disk drives such as 17 and 18. The front frame member 15b including the vertical portion 51 and the angle transition portion 52 also provides a recess which is in common with the recess G-1 in the bezel 10 and includes frame support so that the user may grip the tower unit T and move it about. The generally vertical section 51 and the angle transition section 52 of the front frame member is formed of one piece of aluminum.

A gripping support 53 is mounted by screws 54 onto the end of the transitional section 52 and extends downwardly perpendicularly to transition member 52, which is at angle 21 (FIG. 1B) with respect to horizontal. The gripping section 53 includes a generally U-shaped band of metal 53b which is formed by folding over an extended end portion of the gripping support 53. The U-shaped portion includes side wings 53c and 53d integrally formed with the main folded over portion 53e, which portions 53c, d and e are bent into the U-shaped configuration shown in FIG. 8.

The U-shaped end members or wings 53c and 53d extend into slots 54a and 54b, respectively, in the front wall portion 51 of the frame front 15b. The edges of the slots 54a and 54b serve to limit the amount of flex of the grip supports 53, but to allow some flex upon the initial exertion of force. Please note that the bottom end of the grip support 53 is flush with the bottom face of the transitional bezel portion 10d so that the operator may insert his or her hand into the recess G-1 and actually grip the interior of the support member 53 and wrap his or her hand around the bottom of the support member 53 and the transitional bezel portion 10d to thereby grip the tower unit T for moving the tower unit about. The gripping means provided by recess G-1 may be used in cooperation with gripping point G-2. Or, gripping recess G-1 may be used by itself by the user applying lifting action against support 52 which will allow the tower unit to tilt and be carried by one hand if the person is strong enough. The opening of the gripping means G-1 also provides for substantial circulation through the frame 15.

Figure 10:
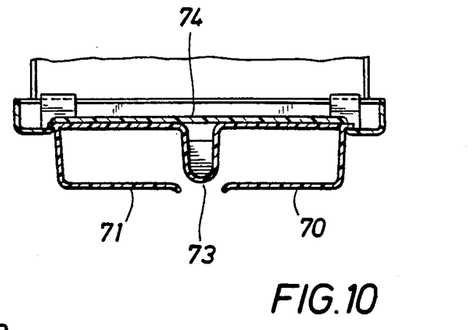
FIG. 10 is a sectional view taken along line 10—10 of FIG. 9 illustrating the rear end panel door for gaining access to the hard disk drive units mounted in the lower portion of the tower unit.
Figure 11:
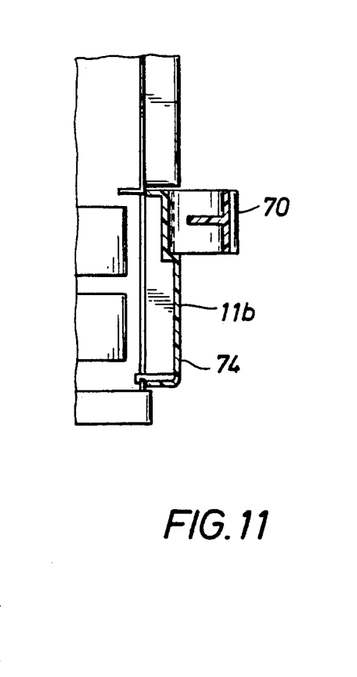
FIG. 11 is a view in section taken along line 11—11 of FIG. 9 illustrating another view of the removable door.

Referring to FIGS. 9–11, the rear bezel 11 is illustrated. The rear bezel 11 is generally rectangular in configuration and includes a main portion 11a and a rear door 11b. The main portion 11a includes a substantially rectangular opening 11c which is recessed to allow direct access to the circuit boards to be mounted in area A-3 internally of the chassis 15. The circuit board area is defined by a series of horizontal frame bars 60 in rear frame member 11, which are spaced apart to receive the various circuit boards. An upper recessed area is provided at 11d. This recessed area is formed by an interiorly directed wall portion 61 which is formed with a recessed flat portion 62 which has a series of horizontal openings 62a to enhance circulation. The rectangular interior wall portion 61 includes an upper interiorly directed rim portion 61a which cooperates with the outside upper flat face portion 63 of the bezel to provide an indented area which may be defined as G-2, which is provided as a second gripping point at the rear of the tower unit T.

The combined gripping points G-1 and G-2 allow the user to grip the front (G-1) and the rear (G-2) of the tower unit T to move the unit about. The upper interiorly directed rim portion 61a of the rear bezel is fitted flush against a corresponding interiorly directed frame surface (not shown) on the rear frame wall or panel member 16c such that the frame will support any lifting effort placed or pressure of the user.

The hard disk drives 23a–23d are accessed through a lower door 11b which is mounted at the bottom of the main bezel body portion 11a. The door 11b is illustrated in a top sectional view in FIG. 10 and a side sectional view in FIG. 11. The rear door includes exterior wall elements 70 and 71 which an cooperate with a center section 72 to house some electrical cording. The main door portion 74 is generally rectangular in configuration and fits against the bottom of a bottom edge 75 of the frame 15 and is held in place by any suitable means.

Removal of the door 11b allows access to the hard disk drives 23a–23d.

The present invention has been described in terms of particular embodiments. Obviously, modifications and alterations to these embodiments will be apparent to those skilled in the art in view of this disclosure. This disclosure is not intended to be limiting but to disclose the concepts of the invention and any obvious modifications, changes or equivalencies should be considered as part of this invention.

We claim:

1. A tower unit for a computer system wherein the tower unit is normally located on the floor, the floor serving as a horizontal reference plane, and wherein the tower unit includes a chassis, said chassis comprising:
    a generally rectangular box frame including front and rear walls connected with opposing side walls;
    a portion protruding from said front wall of said rectangular box frame and an angle such that a bottom portion of said protruding portion is provided;
    a first recessed gripping area provided into said protruding portion at said bottom portion; and
    a front bezel mounted onto said front wall over said first recessed gripping area and including a gripping opening which aligns with said first recessed gripping area in said protruding portion.

2. The tower unit set forth in claim 1, wherein:
    said front wall further includes a main section, and said protruding portion includes a bay face angled upwards from said horizontal reference plane and a transitional section located between and integrally formed with said main section and said upwardly angled bay face; and
    said first recessed gripping area being provided in said transitional section by a substantially U-shaped frame member to allow a user to grip said U-shaped frame member to move said tower unit.

3. The tower unit set forth in claim 2, wherein:
    said rear wall has a rear bezel mounted thereon, said rear bezel including a recessed rim to allow for a second gripping area to be utilized in cooperation with said first recessed gripping area.

* * * * *